United States Patent
Washington, II et al.

(10) Patent No.: US 11,920,039 B2
(45) Date of Patent: Mar. 5, 2024

(54) MALACHITE GREEN BASED RADIO-CHROMIC COMPOUNDS AND RADIATION SENSING SYSTEMS INCORPORATING THE COMPOUNDS

(71) Applicants: SAVANNAH RIVER NUCLEAR SOLUTIONS, LLC, Aiken, SC (US); UNIVERSITY OF KENTUCKY RESEARCH FOUNDATION, Lexington, KY (US)

(72) Inventors: Aaron L. Washington, II, Aiken, SC (US); John T. Bobbitt, III, Evans, GA (US); John E. Anthony, Lexington, KY (US); Brent Peters, Aiken, SC (US); James C. Nicholson, North Augusta, GA (US)

(73) Assignees: Battelle Savannah River Alliance, LLC, Aiken, SC (US); University of Kentucky Research Foundation, Lexington, KY (US)

( * ) Notice: Subject to any disclaimer, the term of this patent is extended or adjusted under 35 U.S.C. 154(b) by 332 days.

(21) Appl. No.: 16/775,558

(22) Filed: Jan. 29, 2020

(65) Prior Publication Data
US 2020/0239692 A1    Jul. 30, 2020

Related U.S. Application Data

(60) Provisional application No. 62/798,511, filed on Jan. 30, 2019.

(51) Int. Cl.
*C09B 11/20* (2006.01)
*C09B 11/26* (2006.01)
*C09K 9/02* (2006.01)
*G01T 1/04* (2006.01)

(52) U.S. Cl.
CPC ............. *C09B 11/20* (2013.01); *C09B 11/26* (2013.01); *C09K 9/02* (2013.01); *G01T 1/04* (2013.01)

(58) Field of Classification Search
CPC  C09B 11/20; C09B 11/26; C09K 9/02; G01T 1/04
See application file for complete search history.

(56) References Cited

U.S. PATENT DOCUMENTS

| | | | |
|---|---|---|---|
| 3,995,088 A * | 11/1976 | Garner | B41M 5/136 503/224 |
| 5,206,118 A | 4/1993 | Sidney et al. | |
| 5,451,792 A * | 9/1995 | Maguire | G01T 1/08 250/474.1 |
| 6,524,763 B1 | 2/2003 | Kuroda et al. | |
| 7,098,463 B2 | 8/2006 | Adamovics | |
| 7,227,158 B1 | 6/2007 | Patel et al. | |
| 8,399,859 B2 | 3/2013 | Stanley et al. | |
| 9,086,489 B2 | 7/2015 | Patel | |
| 9,452,989 B2 | 9/2016 | Zang et al. | |
| 9,689,742 B2 | 6/2017 | Hatta | |
| 2005/0208290 A1* | 9/2005 | Patel | G01T 1/06 428/323 |
| 2007/0191520 A1 | 8/2007 | Sugiki et al. | |
| 2009/0224176 A1 | 9/2009 | Patel | |
| 2010/0081208 A1 | 4/2010 | Keite-Telgenbuscher et al. | |
| 2013/0083287 A1 | 4/2013 | Li et al. | |
| 2014/0205360 A1* | 7/2014 | Dokken | A61M 35/006 401/266 |

FOREIGN PATENT DOCUMENTS

GB    1047796    11/1966

OTHER PUBLICATIONS

Ghasem Rezanejade Bardajee, SbCl3-catalyzed one-pot synthesis of 4,4'-diaminotriarylmethanes under solvent-free conditions: Synthesis, characterization, and DFT studies, Beilstein J. Org. Chem. 2011, 7, 135-144. (Year: 2011).*
Jun-Tao Hou • Jian-Wu Gao • Zhan-Hui Zhang, An efficient and convenient protocol for the synthesis of diaminotriarylmethanes, Monatsh Chem (2011) 142:495-499 (Year: 2011).*
Alqathami, et al. "An investigation into ultra-sensitive substituted leucomalachite dye derivatives for use in the PRESAGE® dosimeter" *J. Phys. Conf. Ser.* 444:012034 (2013) pp. 1-5.
Alqathami, et al. "Evaluation of ultra-sensitive leucomalachite dye derivatives for use in the PRESAGE® dosimeter" *Rad. Phys. Chem.* 85 (2013) pp. 204-209.
Banaee, et al. "Introducing a Novel Method for Three Dimensional Dose Map by Optical Computed Tomography" *Ir. J. Rad.* 14:e37282 (2016) pp. 1-5.
Bera, et al. "Facile preparation of new polystyrene leucomalachite green thick films and study of their radiochromic behavior for low doses of gamma radiation" *Int. J. Adv. Chem.* 5 (2017) pp. 80-85.
Chalkley, W. "Low atomic-number dye systems for ionizing radiation measurements" *Photogr. Sci. Eng.* 9 (1965) pp. 159-166.
Chapiro, A. "Chemical modifications in irradiated polymers" *Nucl. Inst. Meth. Phys. Res. Sect. B: Beam Inter. Mater. Atoms* 32 (1988) pp. 111-114.

(Continued)

*Primary Examiner* — Bijan Ahvazi
(74) *Attorney, Agent, or Firm* — Dority & Manning, P.A.

(57) ABSTRACT

Derivatized malachite green leuco dyes for use in radiochromic systems are described. The dyes have the following structure:

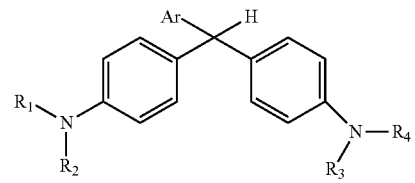

in which Ar is a substituted phenyl or thiophene ring in which at least one substitution of the Ar ring is not ortho to the bond between the ring and the linking carbon, and in which $R_1$, $R_2$, $R_3$, and $R_4$ are independently selected from methyl, alkyl, or alkyl halide. The systems include the dyes in conjunction with an activator, e.g., a halogenated activator, and a carrier, e.g., a fluid carrier or an encapsulating polymeric matrix.

13 Claims, No Drawings

(56) References Cited

OTHER PUBLICATIONS

Devic, S. "Radiochromic film dosimetry: Past, present, and future" *Physica Medica* 27 (2011) pp. 122-134.
DOE. "Nuclear Defense Research and Development Roadmap" *U.S. Dept. Ener.* (2010) pp. 1-60.
EPA. "PAG Manual: Protective Action Guides and Planning Guidance for Radiological Incidents" *U.S. Envir. Prot. Agen.* EPA-400/R-17-001 (2017) pp. 1-112.
EPA. "PAG Manual: Protective Action Guides and Planning Guidance for Radiological Incidents—Draft for Interim Use" *U.S. Envir. Prot. Agen* (2013) pp. 1-86.
EPA. "Manual of Protective Action Guides and Protective Actions for Nuclear Incidents" *U.S. Envir. Prot. Agen.* (1998) pp. 1-483.
FEMA. "Planning Guidance for Response to a Nuclear Detonation" *Nat'l Secur. Staff Interag. Pol.* (2010) pp. 1-135.
FEMA. "Planning Guidance for Response to a Nuclear Detonation" *Nat'l Secur. Staff Interag. Pol.* (2009) pp. 1-97.
FEMA. "Planning Guidance for Protection and Recovery Following Radiological Dispersal Device (RDD) and Improvised Nuclear Device (IND) Incidents" *U.S. Dept. Home. Safety. Fed. Reg.* 73(149) (2008) pp. 45029-45048.
Gafar, et al. "Dosimetric characteristics of 2,6 di-nitro phenol for high dose dosimetry" *Dye Pigm.* 109 (2014) pp. 67-71.
Isa, et al. "Optical properties of conjugated polymer: review of its change mechanism for ionizing radiation sensor" *Polym. Adv. Tech.* (2017) pp. 1559-1571.
Kattan, et al. "The use of polyvinyl chloride films dyed with methyl red in radiation dosimetry" *Int'l. J. Rad. Res.* (2016) pp. 263-267.
Kattan, et al. "A high-dose dosimeter-based polyvinyl chloride dyed with malachite green" *Rad. Phys.* 76 (2007) pp. 1195-1199.
Kosar, J. "Light-Sensitive Systems: chemistry and application of nonsilver halide photographic processes" *John Wiley & Sons, Inc.* (1965) pp. 1-483.
Mclaughlin, et al. "Ch.11: Radiochromic Solid-state Polymerization Reaction" *Irradiation of Polymers ACS* (1996) pp. 152-166.
Mclaughlin, et al. "Ch. 5: Films, Dyes, and Photographic Systems" *Manual on Radiation Dosimetry* Marcel Dekker, Inc. (1970) pp. 129-177.
Miller, et al. "Copolymerization of diacetylenes in the crystalline solid state. A method for recording latent fingerprints" *J. Appl. Polym. Sci.* 24 (1979) pp. 883-886.
Musolino, et al. "Emergency response guidance for the first 48 hours after the outdoor detonation of an explosive radiological dispersal device" *Hlth. Phys. Soc.* 90 (2006) pp. 377-385.
NCRP. "Management of terrorist events involving radioactive material: recommendations of the National Council on Radiation Protection and Measurements" *NCRP Rep.* No. 138 (2001) pp. 1-269.
Niroomand-Rad, et al. "Radiochromic Film Dosimetry: Recommendations of AAPM Radiation Therapy Committee Task Group No. 55" *Med. Phys.* 25 (1998) pp. 2093-2115.
Remm. "Radiological Dispersal Devices" *HHS* (2020) https://www.remm.nlm.gov/rdd.htm (Web only).
Silva, et al. "Low dose ionizing radiation detection using conjugated polymers" *Appl. Phys. Lett.* 86:131902 (2005) pp. 1-3.
Soliman, et al. "A radiochromic film based on leucomalachite green for high-dose dosimetry applications" *Rad. Meas.* 62 (2014).
Soliman, et al. "Leuco crystal violet/poly(vinyl butyral) thin film as a high-dose dosimeter" *Rad. Meas.* 49 (2013) pp. 1-6.
Washington, II, et al. "First Responder Requirements and Potential Operational Uses of 4 Technology: Visual Confirmation of Radiological Exposure using Organic Radiochromic Compounds (ORCs)" (2015).

* cited by examiner

MALACHITE GREEN BASED RADIO-CHROMIC COMPOUNDS AND RADIATION SENSING SYSTEMS INCORPORATING THE COMPOUNDS

CROSS REFERENCE TO RELATED APPLICATION

This application claims filing benefit of U.S. Provisional Patent Application Ser. No. 62/798,511, having a filing date of Jan. 30, 2019, which is incorporated herein by reference for all purposes.

FEDERAL RESEARCH STATEMENT

This invention was made with Government support under Contract No. DE-AC09-085R22470, awarded by the United States Department of Energy. The Government has certain rights in the invention.

BACKGROUND

Organic radio-chromic compounds (ORC) visually display (for instance, via spectroscopy or other visualization techniques) the presence of radiation (e.g., ionizing radiation, high energy radiation, etc.) and have increased the safety of workers in many fields including first responders, researchers, and those involved in the nuclear power and weapons industries. In order to provide the highest level of safety, ORC should ideally allow for real-time monitoring and visual confirmation of radiation in the field, i.e., exhibit a quick response time. In addition, while detection of all forms of radiation (e.g., α, β, and γ) is important, the ability to quickly and visually detect γ radiation at low dosage levels is particularly relevant due to the potential danger and difficulty in shielding from γ radiation.

Leuco dyes are dyes that can switch between visually differentiable forms under thermal, optical, or some other stimulus. Leuco dyes have been investigated as radiation-detecting chromophores and have shown promise for responses required within a few thousand rad. The most common leuco dye, and the one typically used in radiation detecting applications, is malachite green. By themselves, leuco dyes are activated by exposure to only certain radiation energies. However, leuco dyes can be combined with additional substituents that can function as an activator or catalyst to transfer energy into the dye. As such, the combination of the leuco dyes with particular activators can facilitate the hydrogen oxidation/reduction reaction that modifies the optical absorption of the molecule to occur at energies not otherwise feasible for activation of these dyes. The choice of activator, as well as the presence of functional groups, can be used to affect the color shift of the dye. Upon sufficient stimulus, the activator undergoes hemolytic bond cleavage to form a delocalized carbonium cation and to release a radical (e.g., a tri-halo carbon radical), which abstracts a hydrogen from the leuco dye and instigates the color change of the dye. When used in radiation detection, these dyes are generally incorporated with a halocarbon as an activator/catalyst (e.g., highly halogenated compounds, such as carbon tetrachloride or carbon tetrabromide) into a polymer matrix and cast as thin films.

In radiation detection applications, leuco dyes have been shown to have sensitivities ranging from about 2,500 to about $4 \times 10^6$ rad. While such sensitivity levels have proven useful, leuco dyes capable of exhibiting increased sensitivities, e.g., in the millirad range, would be of great benefit.

Moreover, in radiation detection schemes, it is critical to preserve the stability of both the activator and the dye to maintain the effectiveness of the system. Unfortunately, loss of the activator due to, e.g., volatilization, and instability of dyes upon light (e.g., ultraviolet radiation) or air exposure is common, shortening the useful life of detection systems and increasing costs. Further, existing radiation detection systems can only be utilized one time and the system becomes completely degraded, further adding to cost of the systems.

What is needed in the art are leuco dyes and systems incorporating the leuco dyes that can detect low level γ radiation doses quickly and effectively. Systems that can retain stability and effectiveness over long periods, and upon exposure to light and systems that can be utilized multiple times without replacement, would also be of great benefit.

SUMMARY

Disclosed are derivatized malachite green leuco dyes and radio-chromic systems including the dyes. The dyes can include derivatized malachite green leuco dyes having the following structure:

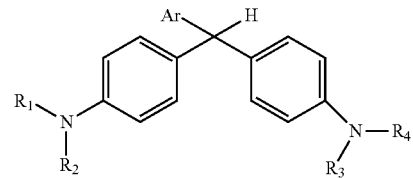

in which Ar is a substituted phenyl or thiophene ring in which at least one substitution of the Ar ring is not ortho to the bond between the ring and the linking carbon and in which $R_1$, $R_2$, $R_3$, and $R_4$ are independently selected from methyl, alkyl (e.g., C1 to C20 straight chain or branched, saturated or unsaturated alkane), or alkyl halide (e.g., C1 to C20 straight chain or branched alkyl halide containing one or more halogens).

In one embodiment, the Ar group can have the following structure:

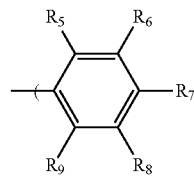

in which $R_5$, $R_6$, $R_7$, $R_8$, and $R_9$ are independently selected from H, C1 to C20 alkoxy, halogen, C1 to C20 halogen functionalized alkyl, C1 to C20 alkylsilyl, C1 to C20 alkylamine, trialkyl ammonium, sulfonyl, formyl, cyano, carboxylate, or nitro; or two adjacent of which ($R_5$ and $R_6$, $R_6$ and $R_7$, $R_7$ and $R_8$, or $R_8$ and $R_9$) forming a fused dioxane ring, a fused dioxolane ring, or a fused aromatic ring or aromatic ring system (e.g., a naphthyl or anthryl ring); or $R_7$ can comprise a phenyl ring and including polycyclic acenes; wherein at least one of $R_6$, $R_7$, and $R_8$ is not hydrogen.

In another embodiment, the Ar group can have the following structure:

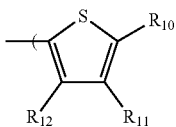

in which $R_{10}$, $R_{11}$, and $R_{12}$ are independently selected from H, C1 to C20 alkoxy, halogen, C1 to C20 halogen functionalized alkyl, C1 to C20 alkylsilyl, C1 to C20 alkylamine, trialkyl ammonium, sulfonyl, formyl, cyano, carboxylate, or nitro; or two adjacent of which forming a fused dioxane or dioxolane ring; or $R_{11}$ can comprise a phenyl ring and including polycyclic acenes.

In another embodiment, the Ar group can encompass an azole and can have the following structure:

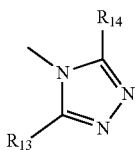

in which $R_{13}$ and $R_{14}$ are independently selected from H, C1 to C20 alkoxy, halogen, C1 to C20 halogen functionalized alkyl, C1 to C20 alkylsilyl, C1 to C20 alkylamine, trialkyl ammonium, sulfonyl, formyl, cyano, carboxylate, or nitro.

A radio-chromic system can include a dye as described and an activator. In one embodiment, both components can be incorporated in a carrier such as a polymeric matrix carrier or a fluid carrier such as in a solution. In one embodiment, the dye and the activator can be directly or indirectly bonded to one another and provided as a single compound that can be provided in a carrier, e.g., a solid polymeric or a fluid carrier, with the dye/activator compound optionally bonded to the carrier, e.g., a polymeric matrix carrier. The activator can include a halogen, and in one embodiment, the activator can be a component of, or bonded to, a carrier (e.g., a halogen-containing solvent or polymeric matrix such as polyvinyl chloride (PVC) or polytetrafluoroethylene (PTFE) that can function as the activator). In another embodiment, the activator can be a halogenated molecular activator (e.g., carbon tetrachloride) that is provided to the system independently from the dye and/or the carrier.

Also disclosed are products incorporating the radio-chromic systems, e.g., dosimeters, foams, aerosols, protective garments, gloves, etc.

Also disclosed are methods for utilizing the dyes in detection of radiation e.g., ionizing radiation or high energy radiation. Beneficially, disclosed dyes and systems can detect radiation, such as low-level γ radiation, at low dosage levels and/or low dosage rates.

DETAILED DESCRIPTION

Reference will now be made in detail to various embodiments of the disclosed subject matter, one or more examples of which are set forth below. Each embodiment is provided by way of explanation of the subject matter, not limitation thereof. In fact, it will be apparent to those skilled in the art that various modifications and variations may be made in the present disclosure without departing from the scope or spirit of the subject matter. For instance, features illustrated or described as part of one embodiment may be used in another embodiment to yield a still further embodiment.

Disclosed are radio-chromic systems and derivatized malachite green leuco dyes that can be included in a system. Disclosed radio-chromic systems can beneficially be utilized in visual or spectroscopic detection of high energy radiation at low dosage levels. As utilized herein, the term "radiation" is used interchangeably with "high energy radiation" and "ionizing radiation" and is intended to refer to electromagnetic radiation having an energy level equal to or greater than that of X-rays, i.e., about 124 eV or greater. As utilized herein, the term "light" is intended to refer to electromagnetic radiation from the infrared to the ultraviolet wavelengths and inclusive thereof. For instance, "light" can encompass electromagnetic radiation inclusive of ultraviolet, visible, and infrared radiation, and can include radiation at one or multiple wavelengths from about 100 micrometers to about 100 nanometers, or having energies from about 3 eV to about 1.24 meV in some embodiments.

The malachite green dyes of disclosed systems can exhibit high sensitivity to radiation at a wide range of energy levels. For instance, the malachite green dye systems can exhibit sensitivity to γ radiation at energies ranging from about 1 MeV (e.g., Co-60 at 1.2 MeV) to about 60 keV (e.g., Am-241 at 59.6 keV), though they can also be used to detect energies outside of this range and are not limited to detection of γ radiation.

The radio-chromic systems can provide a detectable response in a very short response time, on the order of about 1 minute in some embodiments, and can do so at low radiation doses and/or at low radiation dose rates. For instance, the radio-chromic systems can exhibit a detectable response at a radiation dose of about 0.4 rad or more, such as from about 0.5 rad to about 5 Mrad, or higher in some embodiments. By way of example, a system can exhibit a response at a radiation dose of about 0.4 rad within about 1 minute of exposure and can reach a full color shift at about 4 rad within about 10 minutes of exposure at a dose rate of 0.4 rad/min (or 24 rad/hr), with even faster response capability in some embodiments, for instance when the dose rate is higher.

Disclosed systems can also exhibit long life with excellent environmental stability against air and light. For instance, even upon long term exposure to light (e.g., days or weeks), the systems can exhibit little or no change in color and can still exhibit a fast and vibrant response within one to a few minutes upon exposure to a low dose of radiation, with response occurring either during or following termination of the exposure. Thus, the systems can remain viable with high quality radiation response for weeks or even months without excessive degradation of system components.

In addition to other benefits, disclosed systems can be multi-use systems. For instance, following a first radiation exposure and visible color change of the system, the color of a system can fade (or change), and the system can lose the color attained during radiation exposure, for instance over a period of from a few minutes (e.g., 30 minutes) to several hours (e.g., over a period of about 15 hours in some embodiments). Upon a second exposure, the system can again respond with a vibrant and fast color change that can again fade (or change) following the exposure. Depending upon the particular characteristics of the system (e.g., loading level and specific structures of the leuco dye, the activator and the polymeric matrix of the system), as well as the total radiation dose of any one exposure, some embodiments of the radio-chromic detection systems can be effective two, three, or even more times before complete degradation of the system occurs and the system must be replaced.

The leuco dyes of the radio-chromic systems include derivatized malachite green leuco dyes. In general, a leuco dye of a system can have the following general structure:

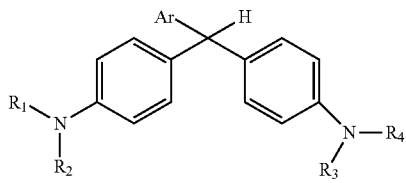

in which Ar is a substituted phenyl or thiophene ring in which at least one substitution of the Ar ring is not ortho to the bond between the ring and the linking carbon and in which $R_1$, $R_2$, $R_3$, and $R_4$ are independently selected from methyl, alkyl (e.g., C1 to C20 straight chain or branched, saturated or unsaturated alkane), or alkyl halide (e.g., C1 to C20 straight chain or branched alkyl halide containing one or more halogens).

In one embodiment, Ar can be a substituted phenyl. For instance, in some embodiments the Ar group can have the following structure:

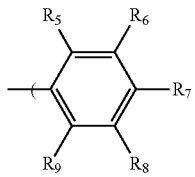

in which $R_5$, $R_6$, $R_7$, $R_8$, and $R_9$ are independently selected from H, C1 to C20 alkoxy, halogen, C1 to C20 halogen functionalized alkyl, C1 to C20 alkylsilyl, C1 to C20 alkylamine, trialkyl ammonium, sulfonyl, formyl, cyano, carboxylate, or nitro; or two adjacent of which (e.g., $R_6$ and $R_7$ or $R_7$ and $R_8$) forming a fused dioxane ring, a fused dioxolane ring, or a fused aromatic ring or aromatic ring system (e.g., a naphthyl or anthryl ring); or $R_7$ can comprise a phenyl ring and including polycyclic acenes; wherein at least one of $R_6$, $R_7$, and $R_8$ is not hydrogen.

By way of example, one or more of $R_6$, $R_7$, and $R_8$ can be methoxy or ethoxy, in any combination and the Ar group can have the following structure:

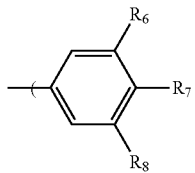

In which $R_6$, $R_7$, and $R_8$ are independently, H, methoxy, or ethoxy, and at least one of $R_6$, $R_7$, and $R_8$ are ethoxy or methoxy. Examples of this embodiment can include, without limitation:

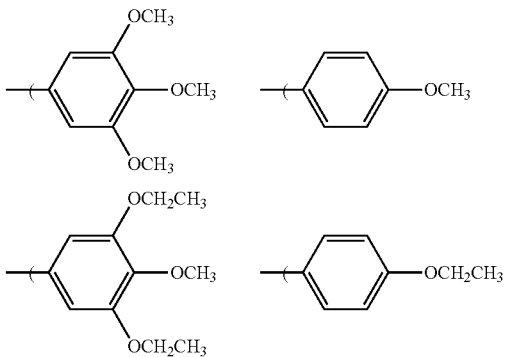

In another embodiment, the aryl group can be functionalized to include a fused dioxane ring, a fused dioxolane ring, or a fused aromatic ring or aromatic ring system, e.g., a fused naphthyl ring or a fused anthryl ring system, for instance at $R_6$ and $R_7$ or at $R_7$ and $R_8$ e.g.:

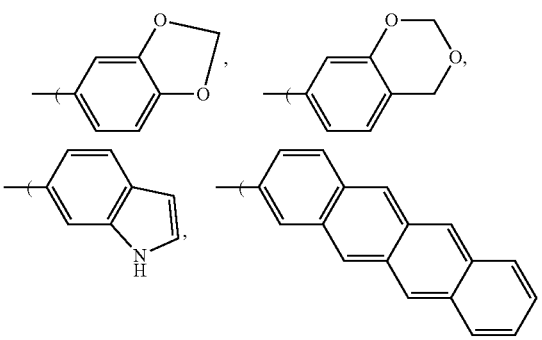

Halogenated substitutions are also encompassed herein, which can include C1 to C20 alkyl halogen groups including one, two, or more halogens on each substituent, e.g.:

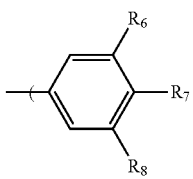

In which $R_6$, $R_7$, and $R_8$ are independently hydrogen, halogen (F, Cl, Br, I), or C1 to C20 haloalkyl including one or more halogens substituted on to each alkyl group, wherein at least one of $R_6$, $R_7$, and $R_8$ is not hydrogen. Examples of this embodiment can include, without limitation:

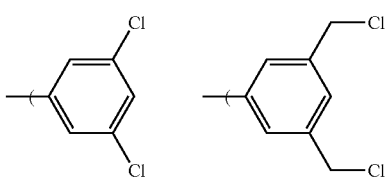

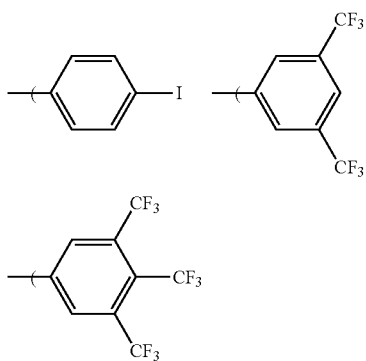

Nitro substituted compounds are also encompassed, e.g.,

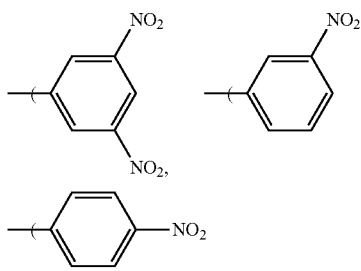

Additional derivative groups of the malachite green leuco dyes can include C1 to C20 alkylsilyl groups and C1 to C20 alkylamine groups. Alkylsilyl substitution groups can include, without limitation, dimethylsilyl, triisopropylsilyl, trimethylsilyl, tri-n-propylsilyl, etc. Alkylamine substitution groups can include, without limitation, dimethylamine, diethylamine, etc.

Combinations of different types of substitution groups are also encompassed in the disclosed leuco dyes, e.g., a phenyl ring including a meta-methoxy substitution and a para-halogen or haloalkyl substitution, etc.

In another embodiment, the Ar group of the derivatized malachite green leuco dyes can include a thiophenyl ring. For instance, in one embodiment the Ar group can have the following structure:

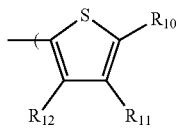

in which $R_{10}$, $R_{11}$, and $R_{12}$ are independently selected from H, C1 to C20 alkoxy, halogen, C1 to C20 halogen functionalized alkyl, C1 to C20 alkylsilyl, C1 to C20 alkylamine, trialkyl ammonium, sulfonyl, formyl, cyano, carboxylate, or nitro; or two adjacent of which forming a fused dioxane or dioxolane ring; or $R_{11}$ can comprise a phenyl ring and including polycyclic acenes. In one embodiment, at least one of $R_{10}$, $R_{11}$, and $R_{12}$ is not hydrogen.

In another embodiment, the Ar group can encompass an azole and can have the following structure:

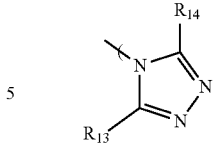

in which $R_{13}$ and $R_{14}$ are independently selected from H, C1 to C20 alkoxy, halogen, C1 to C20 halogen functionalized alkyl, C1 to C20 alkylsilyl, C1 to C20 alkylamine, trialkyl ammonium, sulfonyl, formyl, cyano, carboxylate, or nitro.

In conjunction with a leuco dye, a radio-chromic system can include an activator/catalyst. Activators can encompass chemical compounds which form radical, cationic, or anionic species as a direct result of the absorption of radiation. Activators can include, without limitation, α-hydroxy alkylphenones, acyl phosphine oxides, O-acyl-α-oximinoketones, organic peroxides, phenylgyoxylates, desylarylsulfides, phenyl phenacylsulfides, metallocene derivatives, transition-metal carbonyls, α-amino acids, halogenated hydrocarbons, polyhalogenated hydrocarbons, alkoxyamines, azoalkane derivatives. In one embodiment, activators can form cationic species upon the absorbance of radiation, examples of which include, without limitation, diazonium salts, diaryliodonium salts, triarylsulfonium salts, dialkylphenacylsulfonium salts, ferrocenium salts, α-sulfonyloxyketones, and silyl benzyl ethers.

In one embodiment, an activator can be a halogenated species, and in one particular embodiment, an activator can be a non-polymeric highly halogenated hydrocarbon comprising at least 3 halogen atoms (either the same or different from one another) on the molecule. Specific examples of halogenated activators encompassed herein include, without limitation, 4-benzoyl-N,N,N-trimethylbenzene methaminium chloride; 2-hydroxy-3-(4-benzoylphenoxy)-N,N,N,-trimethyl-1-propaniminium chloride; 2-hydroxy-3-(3,4-dimethyl-9-oxo-9H-thioxanthon-2-yloxy)-N,N,N-trimethyl propaniminium chloride; 4-benzoyl-N,N-dimethyl-N-[2-(1-oxo-2-propenyl)oxy]ethyl benzenemethaminium chloride; tetrachloroethane; carbon tetrachloride; chloroform; dichloromethane; methylene chloride; 1,4-dichloro-2-butene; 1,1-dichloropropane; 1,2-dichloropropane; 1,3-dichloropropane; 2,2-dichloropropane; 1,2-dichlorobutane; 1,3-dichlorobutane; 1,4-dichlorobutane; 1,1,1-trichloroethane; 1,2,2-trichloroethane; 1,2,3-trichloropropane; 1,1,1,2-tetrachloroethane; 1,1,2,2-terachloroethane; bromoform; methylene bromide; dibromomethane; 1,1-dibromo-2,2-bis(chloromethyl)cyclopropane; 1,2-dibromobutane; 1,3-dibromobutane; 1,4-dibromobutane; 2,3-dibromobutane; 1,4-dibromo-2,3-butanedione; 1,4-dibromo-2-butene; 1-bromo-4-chlorobutane; 1-bromo-2-chloroethane; 1-bromo-6-chlorohexane; bromochloromethane; 1-bromo-5-chloropentane; 1-bromo-3-chloropropane; 2-bromo-1-chloropropane; 1,1,2-tribromoethane; 2,4,5-tribromoimidazole; 1,2,3-tribromopropane; bromodichloromethane; chlorodibromomethane; α-(trichloromethyl)benzyl acetate; diphenyliodonium hexafluorophosphate; 4-methylphenyl-4'-isobutryl iodonium hexafluorophosphate; and ferrocene.

In general, a leuco dye and an activator can be present in a system in a weight ratio to one another of from about 500:1 to about 1:500, about 99:1 to about 1:99, or about 20:1 to about 1:20 in some embodiments. In addition, a leuco dye can be present independently of an activator (e.g., in a blend or mixture with the activator) or can be directly or indirectly bonded to an activator. In another embodiment, activator and leuco dye can be present in a system in which a portion of the activator component is bonded directly or indirectly to a leuco dye and a portion of the activator component is present mixed or blended with the rest of the system. The bonded and non-bonded activator components in such an embodiment can be the same or different from one another.

A system can also include a carrier, e.g., a polymeric matrix or a fluid carrier that can carry the leuco dye and, as necessary, can also carry the activator. In one embodiment, the activator and/or the leuco dye can be bonded to or a component of the carrier. For instance, in one embodiment, a liquid carrier can include the activator as a solvent of the system and the leuco dye can be blended with the system. In another embodiment, a polymer of a solid polymeric matrix can include an activator component, e.g., a halogen. For instance, a polymeric matrix can include a chlorinated or fluorinated component. Examples of which include, without limitation, homopolymers or copolymers (e.g., block or random copolymers) including ethylene chloride, ethylene fluoride, etc. such as polyvinyl chlorides (PVC), polytetrafluoroethylenes (PTFE), etc. as a component of the polymeric matrix. The leuco dye can be incorporated in the polymeric matrix and, in some embodiments, the leuco dye can be bonded to the polymeric matrix. In one embodiment, the leuco dye and the activator can be directly or indirectly bonded to one another and this compound can then be incorporated with a carrier, either mixed/blended or bonded to a component of the carrier, as desired.

As stated, in some embodiments, the activator can be a molecular activator incorporated with the leuco dye in the carrier and the carrier can be any suitable material that does not provide a direct function in the activator/dye system. Preferred carriers (liquid, solid, polymer components, etc.) can generally vary depending upon the specific application of the radio-chromic system.

Exemplary polymers for use in a polymeric radio-chromic system can include, without limitation, polyacetals, polyacetaldehydes, polyacetates, polyacetylenes, polyacrylamides, polyamideimides, polyacrylates, polyacrylic acids, polyacrylonitriles, poly(melamine formaldehyde), polyalkylsilynes, poly(amic acids), polyamides, polycaproic acids, polyanilines, polyaramides, polyarylates, polybenzimidazoles, polybenzothiazones, polybenzoxazoles, polyalkadienes (such as polybutadienes or polypentadienes), polybutenes, poly(alkylene terephthalates), poly(caprolactams), poly (caprolactones), polycarbonates, polycarbosilanes, polychloroprenes, polyalkylenes (such as polyethylenes, polypropylenes, and polybutenes), polyalkyleneoxides (such as polyethylene oxides or poly-p-phenyleneoxides), polyalkylenesulfides (such as polyethylene sulfides), polysilanes, polysiloxanes, polysilylenes, polyepichlorohydrins, polyesteramides, polyesters, polyimides, polyethers, polyalkylene glycols, polyglycols, polyether glycols, polyetherimides, polyketones, polysulfones, polyethyleneimines, polyimidosulfides, polyketones, polyisoprenes, polyphosphates, polynitriles, polystyrenes, polyurethanes, polytriazoles, polyterpenes, polynitrides and polysulfides.

Exemplary liquid carriers can include, without limitation, halogenated solvents including chloroform, dichloromethane, etc.

The leuco dye component can generally be present in a system in an amount of from about 0.2 wt. % to about 50 wt. %, about 0.5 wt. % to about 45 wt. %, about 1 wt. % to about 40 wt. %, or about 5 wt. % to about 35 wt. % in some embodiments by weight of a carrier.

Additional additives as are generally known in the art can also be included in the radio-chromic system such as, and without limitation to, plasticizers, nucleators, foaming agents, UV stabilizers, etc. in polymeric systems and solvents, stabilizers, etc. in liquid systems. Disclosed systems can exhibit excellent stability to light even without the addition of a UV stabilizer to a system, and the addition of a UV stabilizer can further improve the systems and increase the lifespan of a product incorporating a system. UV stabilizers as may be incorporated in a system can include, without limitation, antioxidants, UV absorbers, and radical scavengers.

The components of a system can be combined in any suitable fashion. For instance, a leuco dye and a molecular activator (along with any other desired additives) can be combined with polymer precursors, and polymerization can be carried out in the presence of the other components of a system so as to form a composite, optionally with one or both of the dye and the activator components bonded to the polymer. In another embodiment, a leuco dye and a molecular activator can be combined with a pre-formed polymer, and the components can be processed (e.g., melt processed or solution processed) to provide the radio-chromic system.

The systems can be provided in any desired form (e.g., liquid, gel, particles, fibers, foams, coatings, molded structures, etc.) and can be combined with other materials in formation of a useful product.

In one embodiment, components of a system can be utilized in an additive manufacturing process, e.g., 3D printing. For instance, leuco dye, activator, and polymer system components can be supplied either together or separately and deposited by any suitable fashion (e.g., extruded) so as to be laid down in successive layers to form a 3D structure according to an additive manufacturing process.

In some embodiments, one or more components of a system can be supplied in conjunction with a secondary carrier. For example, an aqueous or organic liquid or gaseous carrier can be utilized for carrying polymeric particles that incorporate a leuco dye and an activator as described. For instance, a secondary carrier can provide a desired viscosity to a system so as to enable successful deposition of a composition and formation of a desired product (e.g., a 3D printed structure). For instance, one or more of a leuco dye, an activator, and a polymer or a polymer precursor can be supplied to a print head in conjunction with a solvent, etc., in the form of a printable composition (e.g., a printable ink). Following deposition, the printed composition can be actively or passively solidified through, e.g., solvent removal (drying or heating), polymerization of polymer precursors, polymer solidification (e.g., cooling, crosslinking, etc.), and adhered to adjacent layers to form a final product.

In those embodiments in which system components are provided separately, the components can be provided such that in the final product, a carrier can encase or encapsulate a leuco dye and, when present, a molecular activator so as to provide protection and long life to the multi-component system. For instance, a first ink carrying a leuco dye and an activator in a liquid carrier can be printed in a desired pattern, and a second ink (or melt) carrying a polymer or polymer precursors can be printed so as to encapsulate and cover the previously printed dye/activator composition. Following solidification, the three-dimensional structure can incorporate the radio-chromic system.

In one embodiment, a carrier can provide for deposition of a radio-chromic system in the form of a coating. For instance, a system can be in the form of small polymeric particles (e.g., nanometer or micrometer-sized polymeric particles encapsulating a leuco dye and, as needed, a molecular activator) and provided in conjunction with a secondary carrier in the form of a liquid, vapor, or gaseous fluid carrier to provide a system in the form of an aerosol, a paint, an ink, or the like. Polymeric particles comprising system components can be formed according to standard methodologies, e.g., solution spraying, precipitation, nucleation, etc.

In another embodiment, a leuco dye and a molecular activator can be provided in conjunction with a fluid carrier for deposition of the system that does not also include a polymeric matrix.

In another embodiment, the system components can be provided in a melt or polymer solution conducive for molding, e.g., extrusion molding, injection molding, blow molding, thermoform molding, etc. In one embodiment, the composition can be molded to provide flat panels or sheets as may be utilized in forming a wearable badge and the like. In another embodiment, a composition can be molded to form fibers that can then be utilized in forming a product, e.g., a woven or nonwoven "smart" material for use in radiation detection. Moldable compositions can be utilized in wearable products, e.g., protective clothing, gloves, glasses, etc. as well as other useful items such as shields, construction panels, containers, etc.

In yet another embodiment, a composition can incorporate a foaming agent and, upon deposition, the foaming agent and polymer can together form a foam, e.g., a high density foam or a fire suppressant foam. Such an embodiment can be highly beneficial in a first responder application, so as to determine the presence of radioactive materials in the location of a fire or other emergency application.

Disclosed systems can be useful in public and private sections and can be utilized for any person or location with potential exposure to radiological materials including, without limitation, first responders, field workers in the nuclear power industry, researchers, military researchers and workers, etc.

The present disclosure may be better understood with reference to the examples set forth below.

Example 1

Unless stated otherwise, all radiation exposure was carried out in an irradiation chamber using Co-60 as radiation agent at a dose rate of approximately 1000 rad/min.

A trifluoromethane derivatized leuco dye and a dichloro derivatized leuco dye were formed having the following structures:

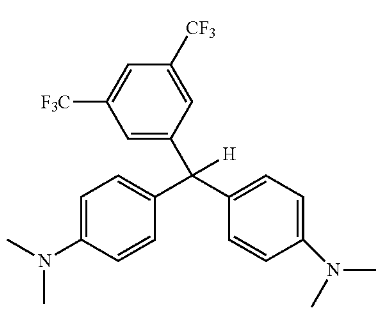

-continued

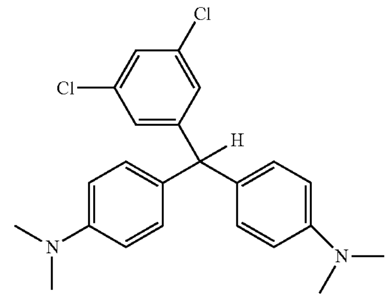

The dyes were placed into an irradiator and irradiated with Co-60 for 30 seconds, 1 minute, 10 minutes, 50 minutes and 23 hours. After 10 minutes irradiation, there was no visible change. After 23 hours, the dichloro compound showed some color change to green (from clear).

The same dyes were combined with chloroform as the activator, left exposed to light for about 12 hours and then irradiated with Co-60. Irradiation occurred at the following exposure times: 30 seconds, 1 minutes, 5 minutes, and 24 hours (total time). When the leuco dyes were dissolved/combined with chloroform, they changed colors, after a 5-minute exposure, the trifluoromethane compound turned light blue, and the dichloro compound changed from yellow to light green.

Example 2

A trifluoromethane derivatized leuco dye, a chloro derivatized leuco dye, and a trimethoxy derivatized leuco dye were formed having the following structures:

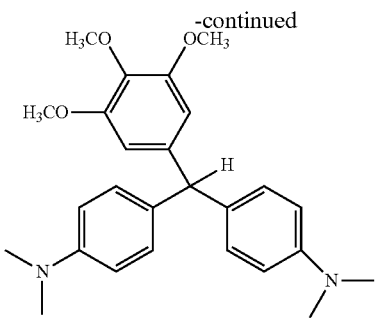

The dyes were dissolved in chloroform as activator and the methoxy dye was also tested in powder form. Co-60 irradiation occurred at the following intervals: 30 seconds, 1 minute, 5 minutes, 10 minutes, and 24 hours (total time).

When the leuco dyes were dissolved/combined with chloroform, the chloro- and trifluoromethane dyes changed colors. The trifluoromethane derivatized compound turned from a white powder to a light blue solution, and the chloro compound changed from yellow to light green, while the methoxy powder (no activator) changed from a white powder to a clear liquid.

After 30 seconds of irradiation, the methoxy activated system (chloroform solution) began to turn a slight blue, while the control (no irradiation) remained clear. The color continued to increase in intensity with increasing radiation, and at a 5-minute irradiation time, the color was a bright blue. The trifluoromethane system turned light blue after a 5-minute irradiation. At a 10-minute irradiation, it was noted that the chloro-dye system had darkened slightly compared to the control. The colors of the three activated systems continued to darken with longer exposure times, up to a 20-hour exposure.

The methoxy dye (both with and without a chloroform activator) and the activated trifluoromethane system were compared to a surfactant (both with and without chloroform). Initially, the trifluoromethane system was dark blue and the activated methoxy system was clear. The colors of the activated samples exhibited change in color within two hours of radiation exposure, and with a 17-hour exposure, the activated methoxy system was a light blue and the trifluoromethane system was clear. The controls were not exposed to radiation but were left in the irradiator room under low light conditions. The controls showed no change.

The trifluoromethane dye system and the methoxy dye system were then evaluated for multi-use capabilities. The samples, including the dyes and a chloroform activator, were irradiated for a period of time from 5 to 30 minutes (each sample irradiated for a different time period) and then removed from the irradiator. After the exposure, all dyes exhibited a visible response. At two hours post-exposure, trifluoromethane systems exposed up to 20 minutes had faded to clear, and the 30-minute exposure sample was light blue. The methoxy dyes had also faded, but still retained some color.

The trifluoromethane dyes were then subjected to a second round of radiation exposure for up to 30 minutes and all samples demonstrated a second visual response to the radiation exposure.

Samples were also exposed to light following preparation in a dark environment. Following 5 minutes of direct light exposure, a trifluoromethane dye system exhibited a slight color change. Upon removal to the dark again, the sample was again clear following 30 minutes in the dark. Upon a second removal to direct light, the sample remained clear, and it is believed that the color change upon the initial direct light exposure was due to an unconfirmed source.

Example 3

Derivatized dyes were formed having the following generic structure:

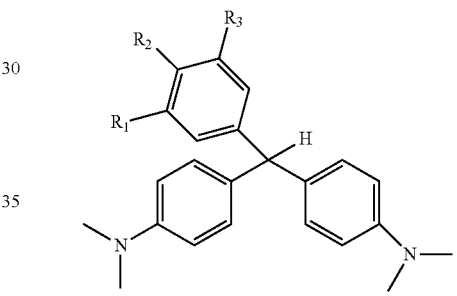

and including the following as R groups:
Dye 1—$R_1$=H, $R_2$=Br, $R_3$=H
Dye 2—$R_1$=H, $R_2$=$NO_2$, $R_3$=H
Dye 3—$R_1$=$OCH_3$, $R_2$=$OCH_2CH_3$, $R_3$=$OCH_3$
Dye 4—$R_1$=H, $R_2$=F, $R_3$=H
Dye 5—=H, $R_2$=$OCH_3$, $R_3$=H The dyes were activated with chloroform and exposed to radiation (Co-60) for various time periods. As control, each dye system was also exposed only to low light exposure. Results are summarized in Table 1.

TABLE 1

| Irradiation time | Dye 1 | Dye 2 | Dye 3 | Dye 4 | Dye 5 |
| --- | --- | --- | --- | --- | --- |
| 30 sec. | control - slight darkening; sample - some darkening | control - no change; sample - no change | control - no change; sample - clear blue transition | control - no change; sample - no change | control - no change; sample - bright blue transition |
| 1 min. | control - add'l darkening; sample-faster color change | control - no change; sample began to lighten | control - no change; sample-further blue transition | control - no change; sample - no change | control - no change; sample - bright blue transition |
| 2 min. | control - same as 1 min.; sample - same as 1 min. | control - no change; sample began to turn green | control - no change; sample - same as 1 min. | control - no change; sample - no change | control - no change; sample - same as 1 min. |

TABLE 1-continued

| Irradiation time | Dye 1 | Dye 2 | Dye 3 | Dye 4 | Dye 5 |
|---|---|---|---|---|---|
| 5 min. | control - slight darkening; sample - same as 5 min. | control - no change; sample - shift to green | control - no change; sample - shift to bright blue | control - no change; sample - slight blue transition | control - no change; sample - shifting to dark green |
| 10 min. | control - slight darkening; sample - slight darkening | control - no change; sample - shift to bright green | control - no change; sample - shift to green/blue | control - no change; sample - light blue transition | control - slight change; sample - shift to dark green |
| 20 min. | control - slight darkening; sample-further darkening | control - no change; sample - shift to brighter green | control - no change; sample- darker green/blue | control - no change; sample - more blue transition | control - slight change; sample - shift to dark green |

The test was run again with the samples in amber vials, and no differences were seen in the response due to vial color. Specifically, clear vials were used as control and were kept in low-light conditions for 25 minutes with samples, including amber vials, containing the dyes with chloroform activator were irradiated (Co-60) for 5 minutes after being kept in low light for 20 minutes. Large differences were seen between controls and test samples for Dye 2, 3, 4, and 5.

Dye 2 was examined over a period of about 24 hours. As control, an activated system including Dye 2 and chloroform in a clear vial was stored in low light for about 36 hours (yellow in color). Dye 2 in a clear vial with no activator exhibited no change after 24 hours of irradiation. Dye 2 and chloroform after 24 hours of irradiation appeared dark green in color. The sample was then removed from the irradiation chamber and the sample changed back to yellow. Following, a second irradiation of the sample held in an amber vial was carried out for 5 minutes, upon which the sample again turned green.

Comparison of a trimethoxy dye with Dye 3, in which a methoxy was replaced with an ethoxy, increased the sensitivity of the dye. Dye 3 exhibited an initial color shift around the 30-second mark of irradiation, as compared to around 1 minute for a trimethoxy-substituted dye. After about 5 minutes of irradiation, the two dyes appear the same color, but after 20 minutes of irradiation, the trimethoxy dye system had a deep green color, while Dye 3 had a bright blue color. Both of these dyes exhibited slight low light sensitivity. Post-irradiation, both Dye 3 and a trimethoxy-substituted dye lightened in color slightly.

Example 4

A nitro dye (Dye 2 of Example 3) system with 1 wt. % loading of dye in chloroform was formed and showed a color shift to green after 30 seconds (about a 500 rad dose). A 2 wt. % dye loading system of the same dye didn't show a significant color change until about 5 minutes (about a 5,000 rad dose). Post-irradiation, both systems with the different loading levels of Dye 2 showed significant color shift. The 1 wt. % Dye 2 system shifted to a lighter green and the 2 wt. % began to shift back to the original yellow after 17 hours.

The two nitro systems were examined for re-irradiation use. The 2 wt. % system was still responsive after the initial exposure and return to the original color. The re-irradiation response was seen for the 2 wt. % system at three different exposure levels including about 20.5 krad (20 minutes), about 5,000 rad (5 minutes), and about 10,000 rad (10 minutes).

The shelf life of the nitro dye was also examined. After approximately two weeks in dark storage, a nitro dye stored in activator solution exhibited a slight darkening. Following exposure to about 1000 rad (1 minute), there was no noticeable change; after exposure to about 5000 rad (5 minutes), there was a noticeable change from yellow to green; and after exposure to about 10000 rad (10 minutes), there was a noticeable green color shift.

Another nitro sample was prepared and stored in the dark for one day. Following dark storage, the sample was moved to direct light for about 151 hours; there was no visible shift in color due to light exposure.

Several different systems were prepared including the nitro dye (Dye 2 of Example 3) at different loading levels including 0.5 wt. %, 1 wt. %, 2 wt. %, and 5 wt. % loadings in chloroform. At 10-second exposure (about 170 rad), there was a slight shift seen in the 0.5 wt. % and 1 wt. % loadings, and no noticeable shift in the 2 wt. % and 5 wt. % loadings. At 20-second exposure (about 350 rad), there was a visible shift in the 0.5 wt. % and 1 wt. % loadings, and no noticeable shift in the 2 wt. % and 5 wt. % loadings. At 30-second exposure (about 510 rad), darkening was seen in the 0.5 wt. % and 1 wt. % loadings, and no noticeable shift in the 2 wt. % and 5 wt. % loadings. At 1-minute exposure (about 1000 rad), the 2 wt. % loading shifted from light orange to yellow. At exposures of 2 minutes (about 2000 rad), 3 minutes (about 3000 rad), 4 minutes (about 4000 rad), 5 minutes (about 5000 rad), 10 minutes (about 10 krad), 15 minutes (about 15 krad) and 20 minutes (about 20 krad), all dyes showed a visible shift with darkening colors at longer radiation exposure times.

Following exposure, all samples showed reversibility in color shift, with the lower loading levels turning to a light green and the 2 wt. % loading turning to almost yellow. The 5 wt. % loading sample turned to a brown after exposure.

While certain embodiments of the disclosed subject matter have been described using specific terms, such description is for illustrative purposes only, and it is to be understood that changes and variations may be made without departing from the spirit or scope of the subject matter.

What is claimed is:

1. A radio-chromic system comprising: a derivatized leuco dye having the following structure:

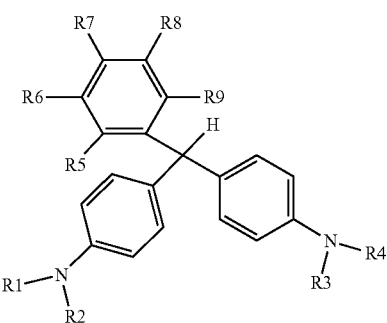

in which
- R1, R2, R3, and R4 are independently selected from the group consisting of alkyl and alkyl halide,
- R5 and R9 are independently selected from the group consisting of H, C1 to C20 alkoxy, halogen, C1 to C20 halogen-functionalized alkyl, C1 to C20 alkylsilyl, sulfonyl; formyl, and carboxylate,
- R7 is selected from the group consisting of H, C1 to C20 alkoxy, halogen, C1 to C20 halogen-functionalized alkyl, C1 to C20 alkylsilyl, sulfonyl, formyl, and carboxylate, or said R7 includes a phenyl ring,
- R6 is C1 to C20 halogen-functionalized alkyl, and
- R8 is C1 to C20 halogen-functionalized alkyl;
- the radiochromic system further comprising a halogenated activator that forms a radical, a cationic species, or an anionic species upon absorption of radiation; and
- the radiochromic system further comprising a polymeric matrix.

2. The radio-chromic system of claim 1, the derivatized leuco dye being present in the system in an amount of from about 0.2 wt. % to about 50 wt. % by weight of the polymeric matrix.

3. The radio-chromic system of claim 1, the derivatized leuco dye and the activator being present in the system in a weight ratio to one another of from about 500:1 to about 1:500.

4. A molded component comprising the radio-chromic system of claim 1.

5. The molded component of claim 4, wherein the molded component is an extruded component or an injection molded component.

6. A foam comprising the radio-chromic system of claim 1.

7. A particle comprising the radio-chromic system of claim 1.

8. A mixture comprising the particle of claim 7 dispersed in a fluid.

9. An additive manufactured structure comprising the radio-chromic system of claim 1.

10. The system of claim 1, wherein said R7 is methoxy or ethoxy.

11. The system of claim 1, wherein said R7 is selected from the group consisting of a halogen and a C1 haloalkyl that includes three halogens substituted on the carbon.

12. The system of claim 1, wherein the leuco dye has the following structure:

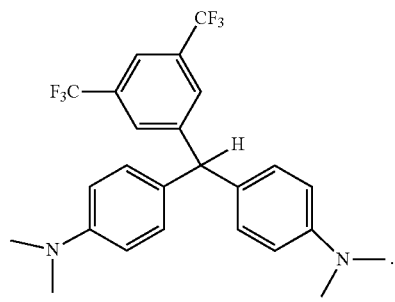

13. The system of claim 1, wherein at least one of said R6 and said R8 is a C1 haloalkyl that includes three halogens substituted on the carbon.

* * * * *